B. SPITZER.
PROCESS OF PRODUCING HYDROGEN.
APPLICATION FILED MAR. 12, 1914.
1,118,595.
Patented Nov. 24, 1914.
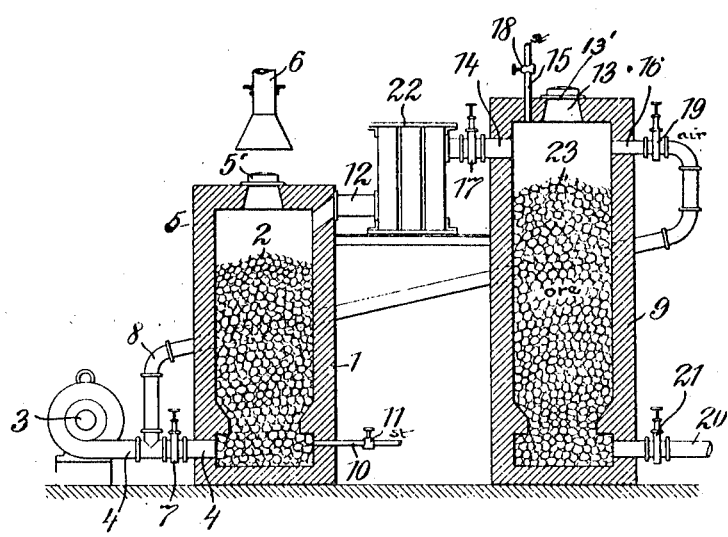
Witnesses:
Charles A. Math
John P. Kirby
Inventor
Bernhard Spitzer
by John Lotka
Attorney

UNITED STATES PATENT OFFICE.

BERNHARD SPITZER, OF BERLIN-WILMERSDORF, GERMANY, ASSIGNOR TO BERLIN-ANHALTISCHE MASCHINENBAU-AKTIEN-GESELLSCHAFT, OF BERLIN, GERMANY, A CORPORATION OF GERMANY.

PROCESS OF PRODUCING HYDROGEN.

1,118,595.  Specification of Letters Patent.  Patented Nov. 24, 1914.

Application filed March 12, 1914. Serial No. 824,335.

*To all whom it may concern:*

Be it known that I, BERNHARD SPITZER, a citizen of the Empire of Germany, and a resident of Berlin-Wilmersdorf, Germany, have invented certain new and useful Improvements in the Process of Producing Hydrogen, of which the following is a specification.

My invention relates to improvements in the process of producing hydrogen, and more particularly to the process in which the hydrogen is produced by causing steam to act on iron or iron sponge at high temperature. As is well-known in the art, in this process the metallic iron is oxidized into magnetite. If the latter is treated at high temperature with reducing gases such as carbonmonoxid, producer gas, water gas, or the like, the iron oxid is again reduced into metallic iron which can again be used for producing hydrogen.

The iron or the iron ore can be heated directly in a shaft by passing burning gases through the same which give off their heat to the charge of iron or iron ore. On the other hand the heat which is necessary in the oxidizing or reducing processes can be supplied to the iron or iron ore indirectly by bringing the iron or iron ore into retorts which are externally heated by heating gases. For directly heating the iron or iron ore shafts are used into which the material is charged for being heated therein. Thereupon, for producing hydrogen reducing gases are passed through the hot charge of iron ore which is thereby reduced into metallic iron, whereupon steam is passed through the charge, so that the iron is again transformed into magnetite, and hydrogen is set free. This process is objectionable in various respects, so that it has not been carried out in a commercial way. In each case, the same gas has been used both for heating the shaft and reducing the iron ore, that is either producer gas or water gas. Careful experiments have disclosed the defects of this process.

Producer gas is very suitable for heating the shaft when it contains ore, because by reason of its low heating capacity it assures a uniform distribution of the heat through the whole charge of the shaft, and a superheating of parts of the charge is not possible. However in the reducing process producer gas is less available. By reason of its low percentage in carbonmonoxid its reducing action is small, and the said reducing action is further diminished, because the gas carries along about 70 per cent. of inactive gases, such as nitrogen, and carbonic acid, by reason of which the active gas is brought to action only in a diluted state and therefore with less energy. As the actual amount of the reducing gas within the shaft is small, large amounts thereof are necessary for reducing the iron ore, so that the reducing gas passes through the charge of the shaft at high velocity. Careful experiments have shown, that the high velocity of the gas is exceedingly objectionable in the reducing process. On the one hand the amount of the reducing gas which is consumed in the process is considerably increased above what is necessary theoretically, and on the other hand the amount of hydrogen which is produced within a certain time in the following oxidizing process is much below what it would be if the gases had passed through the charge during the reducing process at lower velocity. Thereby the process becomes uneconomical. In addition to this the large amount of reducing gas carries along comparatively large amounts of impurities which are deposited on the iron and impair its activity, and when being discharged from the shaft they carry along a large amount of heat which is taken from the charge of iron, which amount is larger than it would be if more concentrated reducing gases were used.

If in the heating and reducing processes instead of producer gas a gas is used which is comparatively rich in reducing agents, for instance, water gas, the reduction of the iron ore is effected in a better way. But the heating effect of the gases is such and it extends over such a limited part of the shaft, that the iron melts together at the inlet of the water gas and is in part made inactive by the reduction of its surface, while other parts of the charge are not sufficiently heated. Besides the use of water gas is inconvenient and expensive, because it is produced in an intermittent operation and therefore a storing chamber is necessary for balancing the production and the consumption. Furthermore, the direct heating of iron ores in shafts was heretofore objectionable, because the reducing gases which are directly supplied to the shaft without being first purified cover the iron ore by reason of their percentage in sulfur with a coating of iron disulfid which prevents the access of the steam to the ore and renders the charge useless after a comparatively short time. Besides the iron disulfid has a lower melting temperature than the iron ore, so that it causes the formation of lumps which interfere with the passage of the reducing gases. When the reducing gases are brought in contact with the charge of iron carbon is precipitated, whereby the efficiency of the iron ore is impaired, unless the said carbon is again consumed when hydrogen is being produced, that is to say, when steam is passed through the charge, which carbon is carried along by the hydrogen in the form of carbonic acid so as to render the hydrogen impure. After having thus found out the reasons for the defects of the process I have been enabled to improve the process in such a way that the injurious effects of producer gas and water gas are avoided, and that the improved process can be carried out in a commercial way.

In my improved process the iron ore is heated by means of producer gases which are particularly suitable for the process, and the iron ore is reduced by means of water gas which is produced in the same generator as the producer gas. The heating of the charge of iron ore or the combustion of the producer gas is effected within the shaft containing the iron ore and with a slight excess of air, so that the deposit of carbon which is produced during the reduction of the iron and the iron disulfid are removed by using an excess of air when heating the charge after the formation of the hydrogen, so that the injurious effect of the carbon and iron disulfid is removed. This process is furthermore advantageous in this respect, that no receptacles for storing the gases are necessary, although different gases are used in the process successively.

Experiments made with my improved process have shown, that the use of superheated steam is particularly advantageous in the oxidizing process, because the amount of hydrogen which is produced within a certain time is so much the greater the higher the temperature of the steam is. Preferably the steam is superheated by means of the burnt producer gases which escape from the shaft and by the combustion of the reducing gases which have not been consumed in the shaft.

In order that my invention be more clearly understood an apparatus suitable for putting the same into effect has been shown in the accompanying drawing, in which a vertical section of the apparatus is shown.

In the example shown in the drawing the apparatus consists of a producer gas generator 1 for gas which is charged with a suitable fuel 2. At the bottom part of the gas generator 1 compressed air can be supplied from a blower 3 and through a pipe 4. The fuel is charged into the generator 1 through an opening 5 provided at the top of the generator and adapted to be closed by a lid 5', and above the said opening there is a chimney 6. The pipe 4 is equipped with a valve 7, and in front of the said valve a pipe 8 is branched off from the pipe 4 which leads to a receptacle 9 providing a shaft for receiving the charge of ore 23. To the lower part of the generator 1 a steam supply pipe 10 is connected which is adapted to be closed by a cock valve 11. The gas produced within the generator is discharged through an outlet 12. The shaft 9 for receiving the ore is likewise provided at its top with an opening 13 which is adapted to be closed by a lid 13'. To the upper part of the shaft 9 pipes 14, 15, and 16 are connected which are adapted to be closed respectively by means of valves 17, 18 and 19. To the lower part of the shaft a pipe 20 is connected which is likewise provided with a valve 21. Between the gas generator 1 and the shaft 9 for the ore a purifier 22 is provided which is adapted to hold back the ashes and other impurities which are carried along by the gases coming from the generator 1.

When starting the operation of the apparatus the fuel such as coke is ignited and brought to high temperature by supplying compressed air thereto from the blower 3. During this blowing period the lid 5' is open, so that the combustion gases can escape through the chimney 6. The valves 17 and 19 are closed. After the fuel has been sufficiently heated the valve 17 is opened and the lid 5' is closed. Now producer gas is discharged from the generator 1 through the pipe 12, passes through the purifier 22 within which ashes and dust are held back, and is admitted to the shaft 9 and to the ore through the opening 14. Simultaneously therewith compressed air is admitted to the shaft 9 from the blower 3 through the pipe 16, the open valve 19, and the opening 16, so that the producer gas is burnt within the shaft. The hot gases of combustion flow through the charge of ore from above and downward, and escape through the pipe 20, and into the atmosphere, the valve 21 being open, or they are supplied to an apparatus for superheating steam. The supply of the air for supporting combustion to the shaft 9 is regulated by means of the valve 19 in such a way, that there is a slight excess of air for combustion. If the charge of ore within the shaft 9 has been brought to the desired temperature, that is to about 700 or 800 degrees centigrade, the valves 19 and 7 are closed, so that the air supply to the generator as well as to the shaft is interrupted. Now the cock valve 11 is opened and steam is admitted to the generator 1 through the pipe 10. By the formation of the producer gas which is necessary for heating the shaft 9 and the ore contained therein the mass of fuel within the generator has been brought to the temperature which is necessary for transforming the steam into water gas. Therefore the same gas generator 1 which during the first stage supplies the producer gas to the shaft 9 for heating the ore contained therein is used subsequently for producing the water gas which is necessary for reducing the mass of iron ore 23. The water gas is also conducted through the pipe 12 and the purifier 22 and it is admitted through the inlet 14 and into the shaft 9 containing the ore. By reason of the heat contained in the gas and the large amount of reducing substances the said gas has a high reducing capacity, and it flows through the mass of ore at low velocity so as to exert a high reducing effect thereon. While the water gas flows through the mass 23 of the ore only a part of the combustible parts thereof are used for reducing the ore. Therefore the waste gases which escape from the shaft through the pipe 20 can be used for superheating steam. After the iron ore has been reduced the valve 11 provided in the steam supply to the gas generator 1 is closed, and the valve 18 of the steam supply 15 to the shaft 9 is opened. Now the steam passes through the pipe 15 and into the shaft 9, where it flows downward through the mass 23 of iron sponge. This causes the iron sponge to be oxidized by the steam, and the hydrogen which is thus produced escapes through the pipe 20 to a purifier and a storage receptacle. In the meantime the temperature within the mass of ore has fallen off, and it must be reheated and reduced, this process being carried out in the same way as has been described above.

For a better distribution of the heat within the shaft containing the ore the steam may be conducted through the mass of ore alternately from above downward and from below upward.

Where the size of the generator is not sufficient to produce the amount of water gas which is necessary in the process in one step the reduction may be conducted in such a way, that the first rough reduction is effected by producer gas, while the final reduction is effected by water gas.

I claim:

1. The herein described process of producing hydrogen which consists in heating a mass of iron ore by means of producer gas and air, reducing the same by means of water gas, and passing steam through the same.

2. The herein described process of producing hydrogen which consists in successively making producer gas within a generator, passing the producer gas which is thus obtained together with air for supporting combustion through a mass of ore for heating the same, passing steam through the generator for producing water gas, conducting the water gas which is thus produced through the mass of ore for reducing the same, and passing steam through the mass of reduced iron ore.

3. The herein described process of producing hydrogen which consists in heating a mass of iron ore by means of producer gas and air, reducing the same successively by means of producer gas and water gas, and passing steam through the same.

4. The herein described process of producing hydrogen which consists in successively making producer gas within a generator, passing the producer gas which is thus obtained together with air for supporting combustion through a mass of ore for heating the same, interrupting the supply of air to the mass of ore while continuing the supply of producer gas for effecting a preliminary reduction, passing steam through the generator for producing water gas, conducting the water gas which is thus produced through the mass of ore for finally reducing the same, and passing steam through the mass of reduced iron ore.

In testimony whereof, I have signed this specification in the presence of two subscribing witnesses.

BERNHARD SPITZER.

Witnesses:
HENRY HASPER,
WOLDEMAR HAUPT.